United States Patent [19]

Kumazaki et al.

[11] Patent Number: 5,674,143
[45] Date of Patent: Oct. 7, 1997

[54] POWER TRANSMISSION BELT AND SYSTEM

[75] Inventors: Toshimi Kumazaki; Koji Kitahama; Isao Deguchi, all of Hyogo, Japan

[73] Assignee: Mitsubishi Belting Ltd., Hyogo, Japan

[21] Appl. No.: 504,908

[22] Filed: Jul. 20, 1995

[30] Foreign Application Priority Data

Dec. 28, 1994 [JP] Japan ................... 6-340262

[51] Int. Cl.$^6$ .................................................. F16G 5/00
[52] U.S. Cl. .................................. 474/263; 474/264
[58] Field of Search .......................... 474/263, 264, 474/265, 237

[56] References Cited

U.S. PATENT DOCUMENTS

| | | | |
|---|---|---|---|
| 4,773,895 | 9/1988 | Takami et al. | 474/263 X |
| 4,798,566 | 1/1989 | Sedlacek | 474/238 |
| 4,936,814 | 6/1990 | Colley et al. | 474/263 |
| 5,112,282 | 5/1992 | Patterson | 474/264 X |
| 5,120,281 | 6/1992 | Mishima et al. | 474/263 |
| 5,413,538 | 5/1995 | Mishima | 474/263 |
| 5,498,212 | 3/1996 | Kumazaki | 474/263 |
| 5,498,213 | 3/1996 | Mishima | 474/263 |

FOREIGN PATENT DOCUMENTS 113940  5/1987  Japan .

*Primary Examiner*—Roger J. Schoeppel
*Attorney, Agent, or Firm*—Wood, Phillips, VanSanten, Clark & Mortimer

[57] ABSTRACT

A power transmission belt having a body with a length, an inside surface, an outside surface, and laterally spaced side surfaces. A plurality of laterally extending, discrete fibers are embedded in the body and have portions projecting from at least one of the side surfaces of the body. The side surfaces make with each other an angle of 42°–50°.

26 Claims, 2 Drawing Sheets

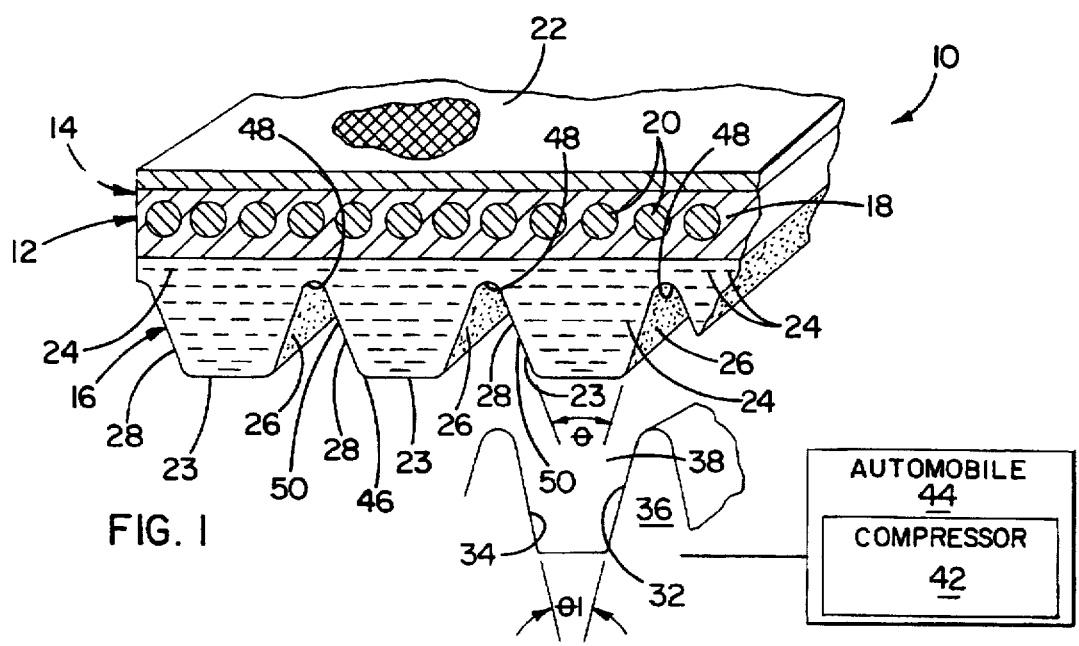
FIG. 1
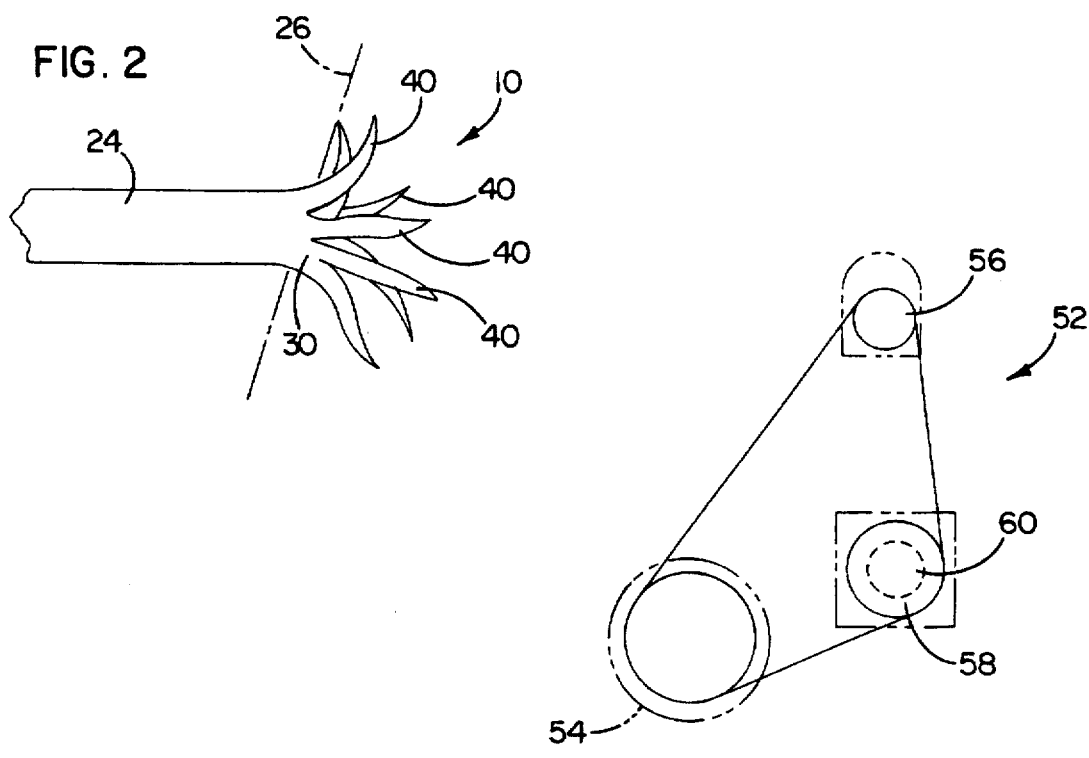
FIG. 2
FIG. 3

1

POWER TRANSMISSION BELT AND SYSTEM

BACKGROUND OF THE INVENTION

1. Field of the Invention

This invention relates to power transmission belts and, more particularly, to a power transmission belt that is constructed to avoid noise generation during running. The invention is also directed to a system within which the power transmission belt is incorporated and which has a cooperating drive/driven pulley.

2. Background Art

A typical V-ribbed belt used for power transmission has a cushion/adhesion rubber layer, with a canvas covering on one side thereof, and a plurality of ribs formed on the other side. Load carrying cords are embedded in the cushion/adhesion rubber layer.

V-ribbed belts have superior power transmission capabilities compared to ordinary V-belts because of the larger contact area that is established between the belts and cooperating pulleys. Because of this power transmission capability, the V-ribbed belt is commonly used to transmit power to auxiliary equipment in the engine compartment on automobiles, such as to air compressors, alternators, etc. in the engine compartment. V-ribbed belts are highly suitable for use in this environment in that they are required to be wrapped in a serpentine arrangement around relatively small diameter pulleys, particularly in modern engine compartments, which have compact and lightweight engines.

The V-ribbed belt has good resistance to flexing fatigue and is capable of transmitting large power forces. It is commonly used in high tension environments to run small diameter pulleys at high speeds.

Recently, environmental agencies have required the replacement of Freon gas (dichlorofluoromethane). Typically, 1,1,1,2-tetrafluoroethane has been used as a substitute for Freon gas, as in the automotive industry. To produce the same cooling effect as Freon, 1,1,1,2-tetrafluoroethane requires a greater compressive force. In the automotive environment this means that a greater torque must be applied to the compressor pulley through the V-ribbed belt.

Ideally, this higher load transmission capability is realized without noise generation, as due to slippage, particularly at startup. Various attempts have been made to provide high force transmission without significant noise generation in this environment.

To address this problem, one power transmission belt has been proposed in Japanese Utility Model Laid-Open No. 5547/1992. The ground surfaces of the ribs on the belt are treated with a powdered anti-sticking agent, such as talc, calcium carbonate, clay, and silica.

It is difficult, however, to apply the anti-sticking agent evenly over the ribs to effect the desired noise reduction.

Another proposed belt construction devised to address this problem is shown in Japanese Patent Publication No. 21607/1994 and Japanese Patent Laid-Open No. 113940/1987. This belt has a compressible rubber layer with short, aramid fibers embedded therein. The ends of a number of the fibers project from the side surfaces of the belt, with the projections being either straight or bent. The short fibers improve wear resistance, provide lateral reinforcement, and reduce noise generation in use.

However, the aramid fibers are, by their nature, relatively stiff and themselves generate noise upon contacting a cooperating pulley.

Another problem with noise generation, particularly in the automotive compressor using 1,1,1,2-tetrafluoroethane, occurs when the slackened V-ribbed belt initially starts the compressor. There is instantaneous slippage which generates noise. This noise is not continuous, but occurs intermittently at the highest compressor torque.

A recently adopted practice has been to install the V-ribbed belts on the pulleys under a high initial tension. As a result, the pulley coating (paint) and the rib rubber wear away relatively easily. The paint and rubber particles migrate into the space between adjacent ribs on the belt. As the pulley moves into the grooves between adjacent ribs, it moves into contact with and separates from the deposits of paint and rubber, thereby generating noise.

The noise resulting from belt slippage at startup and the noise resulting from high belt tension differ in the mechanism by which they are produced. If the surface roughness of the rib, the height of the rib, or the hardness of the rib increases, the noise resulting from belt slippage at startup increases while the noise resulting from high belt tension decreases.

SUMMARY OF THE INVENTION

The present invention is specifically directed to overcoming the above enumerated problems in a novel and simple manner.

One objective of the present invention is to provide a power transmission belt which generates acceptable levels of noise at startup and with the belt installed in a system under high tension.

In one form of the invention, a power transmission belt is provided having a body with a length, an inside surface, an outside surface, and laterally spaced side surfaces. A plurality of laterally extending, discrete fibers are embedded in the body and have portions projecting from at least one of the side surfaces of the body. The side surfaces make with each other an angle of 42°–50°.

In one form, the fibers are para-aramid fibers and the projecting portions of the para-aramid fibers are fibrillized.

The fibers may have a length of 2–6 mm and a diameter of 9–18 μm.

In one form, the fibers are at least one of a) para-aramid fiber, b) para-aramid fiber in combination with at least one of nylon, vinylon, polyester, and meta-aramid fiber, and c) natural fiber that is at least one of cotton and pulp.

The fibrillized portions of the fibers may have a diameter of ⅛ to ½ the diameter of the fibers.

In one form, the belt body is defined at least partially of rubber in which the fibers are embedded and the fibers are present in an amount of 5–15 parts by weight per 100 parts by weight of rubber.

In one form, the body defines a compression section that is defined at least partially by rubber and there is a slip agent in the rubber in an amount 0.5 to 3 parts by weight of slip agent per 100 parts by weight of rubber.

The slip agent may be microcrystalline wax.

In one form, the V-ribbed belt body has an inextensible layer, an extensible layer, and a compressible rubber layer, with the fibers embedded in the compressible rubber layer.

The inextensible layer may have load carrying cords embedded in rubber, with the rubber in which the load carrying cords are embedded and the rubber in the compressible rubber layer being at least one of chloroprene rubber (CR), hydrogenated nitrile rubber (HNBR), natural rubber (NR), chlorosulphonated polyethylene rubber (CSM), and styrene- butadiene rubber (SBR).

The bad carrying cords may be at least one of polyester fiber, nylon fiber, and aramid fiber.

The compressible rubber layer may include 30–70 parts by weight of carbon black to 100 parts by weight of rubber. The compressible rubber layer may further include a vulcanizing agent, accelerator, and an antioxidant.

At least one rubberized canvas layer can be provided on the extensible layer, with the rubberized canvas layer being woven from yarns that are at least one of a) cotton and b) cotton blended with synthetic fiber.

The invention also contemplates the power transmission belt in combination with a pulley having a rotational axis and facing surfaces to engage the side surfaces of the body, with the facing surfaces on the pulley making with each other an angle that is 2°–10° less than the first angle.

The pulley may be associated with a fluid compressor having a shaft that is rotatable to effect operation of the compressor, with the pulley being on the shaft of the fluid compressor. The compressor may be part of any type of system and, in one form, is part of an automobile having an engine compartment in which the compressor resides.

The power transmission belt can be a V-ribbed belt or other type of belt.

In another form of the invention, a power transmission belt is provided having a body with a length, an inside surface, an outside surface, and laterally spaced side surfaces. There are a plurality of laterally extending, discrete fibers embedded in the body and having portions projecting from at least one of the side surfaces of the body. The body includes a compressible rubber layer, with the fibers being present in the compression rubber layer in an amount of 5–15 parts by weight of fiber per 100 weight parts of rubber. A slip agent is provided in the compressible rubber layer and is present in an amount of 0.5 to 3 parts by weight of slip agent per 100 weight parts of rubber.

In one form, the power transmission belt is a V-ribbed belt with a plurality of ribs extending in a lengthwise direction and each having oppositely facing side surfaces making with each other an angle of 42°–50°.

A cooperating pulley can be provided in combination with the power transmission belt and has grooves with facing side surfaces for engaging the ribs and defining with each other an angle that is 2°–10° less than the angle that the side surfaces on the ribs make with each other.

In still another form of the invention, a power transmission system is provided having a power transmission belt and a pulley. The power transmission belt has a body with a length, an inside surface, an outside surface, and laterally spaced side surfaces. A plurality of laterally extending, discrete fibers are embedded in the body and have portions projecting from at least one of the side surfaces of the body. The side surfaces make with each other a first angle. The pulley has a groove with facing surfaces that engage the side surfaces of the body. The facing surfaces on the pulley make with each other a second angle that is 2°–10° less than the first angle.

BRIEF DESCRIPTION OF THE DRAWINGS

FIG. 1 is a fragmentary, cross-sectional, perspective view of a V-ribbed belt and a cooperating pulley, according to the present invention, with the pulley operatively associated with a shaft on a compressor on an automobile;

FIG. 2 is an enlarged, fragmentary, schematic showing of fiber at an exposed side surface of the V-ribbed belt in FIG. 1, with a projecting portion thereof being fibrillated, according to the present invention;

FIG. 3 is a schematic drawing of a system for testing noise generation on a running belt;

DETAILED DESCRIPTION OF THE DRAWINGS

Figure 4:
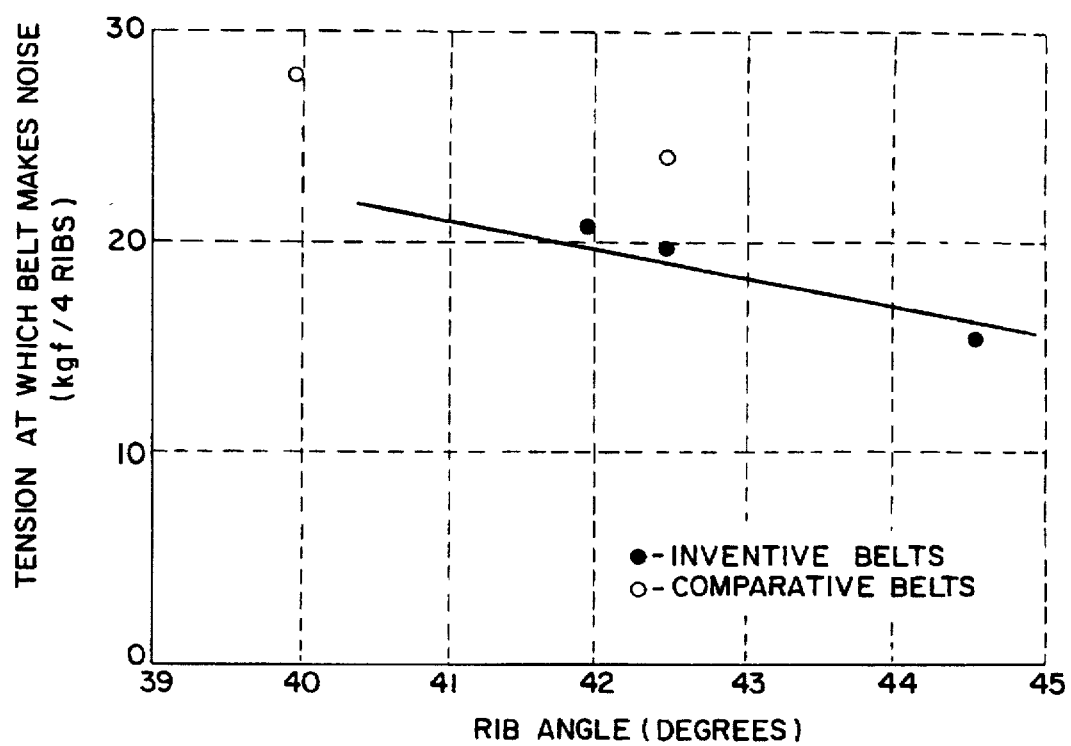
FIG. 4 is a graph showing the relationship between the angle the side surfaces on the ribs on the belt in FIG. 1 make with each other and the tension at which the running belt makes noise.

A power transmission belt, according to the present invention, is shown at 10 in FIGS. 1 and 2. The power transmission belt 10 is exemplary of one belt construction into which the present invention can be incorporated. It should be understood that variations of the type of belt and composition and arrangement of belt components could be changed without departing from the invention.

The power transmission belt 10 is a V-ribbed belt having an inextensible layer 12 with an extensible layer 14 on the outside thereof and a compressible rubber layer 16 on the inside thereof and defining a compression section.

The inextensible layer 12 includes a bonding rubber layer 18 with load carrying cords 20 embedded therein. The bonding rubber layer 18 is made from at least one of chloroprene rubber (CR), hydrogenated nitrile rubber (HNBR), natural rubber (NR), chlorosulphonated polyethylene rubber (CSM), and styrene-butadiene rubber (SBR). The cords are preferably made from at least one of polyester fiber, nylon fiber or aramid fiber.

The extensible layer 14 is shown to include at least one layer 22 of rubberized canvas. The rubberized canvas is woven from yarns that are made from either cotton or cotton blended with a synthetic fiber.

The compressible rubber layer 16 is formed from the same material as the bonding rubber layer 18. A plurality of laterally extending, V-shaped ribs 23 are formed in the compressible rubber layer 16 and extend continuously along the length of the belt 10.

A plurality of laterally extending, discrete fibers 24 are embedded in the compression rubber layer 16 and are exposed at oppositely facing side surfaces 26, 28 on the ribs 23. The fibers 24 are formed by cutting long synthetic or natural fibers to a length of 2–6 mm. The synthetic fibers are preferably para-aramid fiber (polyparaphenylene terephthalamide) such as those sold commercially under the trademarks KEVLAR™ and TWARON™. The para-aramid fiber can be used alone or in combination with a) nylon, vinylon, polyester, or meta-aramid (such as that sold commercially under the trademark CONEX™) or b) natural fiber, such as cotton and pulp.

Preferably, the fibers 24 are present in an amount of 5–25 parts by weight, and more preferably 8–15 parts by weight, per 100 parts by weight of rubber. A blending ratio of para-aramid fiber to the other fibers is from 1:1 to 1:5.

In a preferred form, a plurality of the fibers 24 have portions 30 which project laterally beyond the side surfaces 26,28 of the belt ribs 23. In use, the projecting portions 30 reside between the surfaces 26,28 on the ribs 23 and facing surfaces 32,34 on a pulley 36, which surfaces 32, 34 bound grooves 38 that are complementary to the ribs 23. The pulley surfaces 32,34 abut to the rib surfaces 26,28 as the belt 10 drives/is driven by the pulley 36.

With the fiber 24 present in an amount less than five parts by weight per one hundred parts by weight of rubber, the fibers do not reduce noise to a satisfactory level, with the belt 10 run under high tension. This is because the quantity of short fibers projecting from the surfaces 26,28 of the ribs 23 is not enough to reduce the friction on those surfaces sufficiently so that the ribs 23 do not stick to the pulley surfaces 32,34. This quantity of fiber 24 does not significantly adversely affect the durability of the belt 10.

If the amount of fiber is in excess of 15 parts by weight per 100 parts by weight of rubber, the density of fibers 24 is such that they are not completely surrounded and firmly embedded in the rubber, whereupon they tend to separate from the rubber. This is particularly a problem with the relatively stiff aramid fibers. Fibers 24 present in this amount are, however, effective in reducing noise levels with the belt 10 run at high tension and also account for good resistance to water.

The ribs 23 are formed using a grinding wheel having 80-200 mesh diamond grits. The rotating grinding wheel is pressed against an exposed surface on a vulcanized belt sleeve which is moved in an endless path during the grinding process.

In a preferred form, the para-aramid fibers 24 have a length of 2–6 mm and a diameter of 9–18 µm. Grinding with the above wheel fibrillizes the portions 30 of the paraaramid fibers 24 projecting from the rib surfaces 26,28. The fibrillized end portions 40 of the fibers 24 have a diameter that is reduced to ⅛ to ½ the diameter of the unfibrillized fibers 24. As seen in FIG. 2, the fibrillized ends 40 tend to curl as they are fibrillized. No effective fibrillizing takes place with the projecting meta-aramid fibers.

The fibrillized ends 40 projecting from the rib surfaces 26,28 effectively lower friction between the rib surfaces 26,28 and the cooperating pulley surfaces 32,34. This minimizes wear on the ribs 23 and also avoids sticking problems between the belt ribs 23 and pulley 36. As a result, noise generation due to belt slippage is significantly reduced.

The compressible rubber layer 16 preferably contains a slip agent that is present in an amount of 0.5–3 parts by weight of slip agent per 100 parts by weight of rubber. The slip agent lowers friction between the rib surfaces 26,28 and the cooperating pulley surfaces 32,34. One example of a suitable slip agent is microcrystalline wax. Microcrystalline wax is a mixture of hydrocarbons having a molecular weight of 500–700, with the major components being isoparaffin and cycloparaffin having 35–65 carbon atoms, and the minor component being normal paraffin. Typical examples of this product are 155 MICROWAX™ and 180 MICROWAX™, sold by Nippon Oil Co., Ltd., and SUNTIGHT™, sold by Seiko Kagaku Kogyo Co., Ltd.

The compressible rubber layer 16 is formed from a compound having 30–70 parts by weight of carbon black per 100 parts by weight of rubber. The carbon black improves wear resistance and reduces the tendency of the ribs 23 to stick on the cooperating pulley 36. This rubber compound also contains a vulcanizing agent, accelerator, and antioxidant.

The ribs 23 are constructed so that the side surfaces 26,28 thereon make with each other an angle (θ) in the range of 42°–50°. This angle (θ) is greater than the angle (θ1) that the facing surfaces 32,34 on the pulley 36 make with each other by 2°–10°. This difference in angle causes the ribs 23 to slip on the pulley 36 at startup, as when the machine with which the pulley 36 is associated, and in this case a compressor 42 on an automobile 44, is started. As a result, noise resulting from slippage is reduced.

The limit on the amount of tension at which significant noise is generated when the compressor 42 is started decreases with increasing rib angle (θ). The belt does not generate significant noise with the compressor 42 started while the belt is running steadily under a low tension.

If the difference between the rib angle (θ) and the pulley angle (θ1) is less than two degrees, the edges 46 of the ribs 23 come into contact with the pulley 36. As this occurs, the belt 10 does not slip smoothly on the pulleys 36 at startup of the compressor 42. The result is a significant amount of noise generation.

If the difference between the rib angle (θ) and the pulley angle (θ1) is greater than 10°, the contact area between the rib surfaces 26,28 and pulley surfaces 32,34 is small. In this situation, the ribs 23 are prone to significantly more wear when the belt is run under high tension. Consequently, the belt generates noise as a result of both sticking and wear. Also, the power transmission capability of the belt 10 is reduced. Further, the base 48 of each groove 50 defined between adjacent ribs 23 is prone to wearing, which can ultimately lead to damage to the load carrying cords 20.

It has been found that the ribs 23, according to the invention, do not make any significant noise on a cooperating pulley 36 at startup. By making the compressible rubber layer from the components described above, the belt 10 does not generate a significant amount of noise even in an environment where it is installed under a high initial tension. Further, the rubber compound contains short fibers 24, at least some of which are para-aramid fiber with potions 30 projecting from the rib surfaces 26,28 and fibrillated. The fibrillized ends 40 reduce friction between the rib surfaces 26,28 and pulley 36 and prevent rubber wear by reason of sticking. This also effectively prevents noise due to slippage, which effect is enhanced by incorporating a slip agent.

In one form, the rib angle (θ) is 42°–50°, with the pulley angle (θ1) being 40°. When the belt 10 is wrapped around the pulley 36, the rib angle (θ) becomes slightly larger, with the result being that the root portions of the ribs 23 close to the cords come into contact with the pulley 36. When the compressor 42 is started, the belt 10 is subject to a large side pressure, which causes wear. This problem is avoided by the present invention due to the fact that the ribs 23 have low friction surfaces 26,28. Under this condition, the belt 10 slips and transmits power to the compressor 42 while slipping on the pulley 36. This prevents squeaking noise.

The limit on belt tension at which the belt makes a squeaking noise decreases with the increasing rib angle (θ). Therefore, the belt does not make a significant squeaking noise when the auxiliary machine 42 is started with the belt running under a low tension.

Below is a description of testing that was carried out with the inventive belt and certain comparative belt samples.

The Inventive Belts

A cylindrical mold was used and wound with one layer of canvas 22, which was a cotton plain weave fabric impregnated with chloroprene rubber. The canvas layer 22 was then wrapped with a bonding rubber sheet 18 of chloroprene rubber. Load carrying cords 20 made of polyester fiber (1100d 2×3) were wrapped round the rubber sheet 18. A compressible rubber layer 16, having the composition shown in Table 1 below, was wrapped around the load carrying cords 20 to complete a belt sleeve.

TABLE 1

|  | Example | | |
|---|---|---|---|
| Ingredients | 1 | 2 | 3 |
| Chloroprene rubber | 100 | 100 | 100 |
| Zinc oxide | 5 | 5 | 5 |
| Stearic acid | 2 | 2 | 2 |
| Carbon black FEF | 50 | 35 | 35 |
| Aramid short fibers | 13 | 7 | — |
| Nylon short fibers | 7 | 15 | 20 |
| Microcrystalline wax | 1 | — | — |
| Plasticizer | 6 | 6 | 6 |
| Accelerator | 1 | 1 | 1 |

The belt sleeve was cured at 160° C. for thirty minutes to effect vulcanization. The vulcanized sleeve was removed from the cylindrical mold and trained around spaced drive and driven rolls. The sleeve was run at a predetermined tension. A grinding wheel having 150-mesh diamond grit was run at 1600 rpm and pressed against the running sleeve so as to form the individual ribs 23. Three kinds of samples were prepared, with one of the samples having a rib angle (θ) of 40°, the other having a rib angle (θ) of 42.5°, and the third having a rib angle (θ) of 44.5°.

The sleeve was removed from the drive and driven rolls and mounted on a cuffing machine. The sleeve was cut into four V-ribbed belts (4PK1100), each having four ribs 23. Aramid fibers 24 embedded in the compressible rubber layer projected from the side surfaces 26,28 and were fibrillized during the grinding process.

The individual belts 10 were tested to determine the lower limit of tension at which the belts 10 made noise, the upper limit of tension at which the belts made noise, six percent slippage, speed variation, durability at a high temperature under a low tension, and durability at a low temperature.

a. Lower Limit Of Tension At Which Belts Makes Noise

This test was carried out to measure the lower limit of tension at which the belts 10 made a squeaking noise when the compressor 42, on which the belts 10 were operatively connected, was started from a rest position. The test setup is shown at 52 in FIG. 3. The test setup 52 includes a 135 mm diameter drive pulley 54, a 112 mm diameter pulley 56 coupled to a dynamo, and a pulley 58 coupled to a compressor 42 through a clutch 60. All the pulleys 54,56,58 had V-shaped grooves with an angle (θ1) of 40°.

Each belt sample 10 was trained around the pulleys 54,56,58 and run at room temperature, with the drive pulley 54 being operated at 5000 rpm. The lowest tension at which the belts made a squeaking noise when the compressor was started was recorded. The results are shown in FIG. 4.

b. Upper Limit of Tension At Which Belt Makes Noise

Each belt sample 10 was trained around a drive pulley having a 170 mm diameter and a movable driven pulley having a 72 mm diameter. Both pulleys had V-shaped grooves with an angle (θ1) equal to 40°.

The belts 10 were maintained at a constant tension of 25 kgf/rib. The belt 10 was run at room temperature for thirty minutes, with the drive pulley running at 2000 rpm and the driven pulley given a torque of 1.25 kgf-m. The speed of the drive pulley was reduced to 600 rpm and the load released from the driven pulley. The belt was examined to see if it made noise.

c. Six Percent Slippage

Each belt 10 was then trained around a drive pulley having an 80 mm diameter, a driven pulley having an 80 mm diameter and an idler pulley having a 120 mm diameter. All of the pulleys had V-shaped grooves with an angle (θ1) of 40°. The belts were run at room temperature for twenty four hours, with the drive pulley running at 3000 rpm and the driven pulley given a torque of 9.8N-m so that there was a six percent difference in speed between the drive and driven pulleys. The weight of the belt was measured to calculate the amount of wear.

d. Speed Variation

Each belt 10 was trained around a drive pulley having a 140 mm diameter, a driven pulley having a 116 mm diameter and an idler pulley having a 73 mm diameter. All of the pulleys had V-shaped grooves with an angle (θ1) of 40°. The belts were tensioned by urging a 75 mm flat pulley on an autotensioner against the back surface of the belts. The belts were run at room temperature for twenty four hours, with the drive pulley running at 800 rpm, with a speed variation of twenty percent. The weight of the belt was measured to calculate the amount of wear.

e. Durability at High Temperature Under Low Tension

Figure 5:
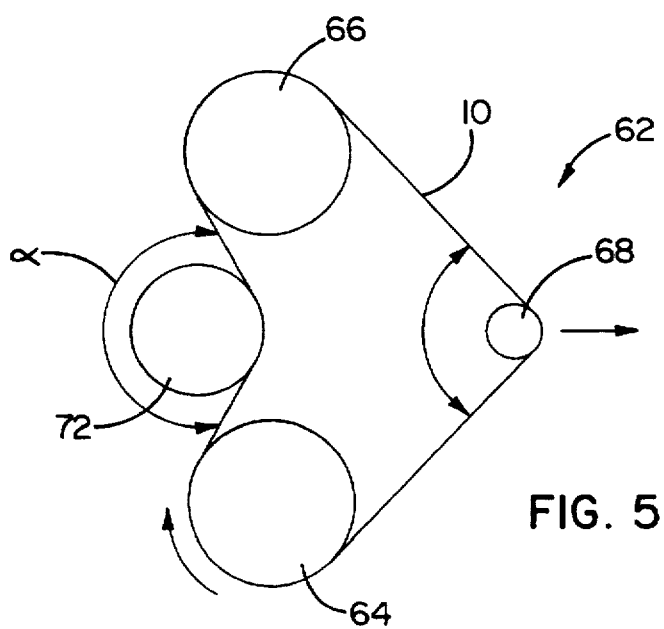
FIG. 5 is a schematic diagram of a system for testing the durability of a belt under low tension and at a high temperature.

Each belt 10 was installed on a system as shown at 62 in FIG. 5. The system 62 has a drive pulley 64 with a 120 mm diameter, a driven pulley 66 having a 120 mm diameter, a tensioning pulley 68 having a 45 mm diameter, and an idler pulley 72 having an 85 mm diameter. All the pulleys 64,66,68,72 had V-shaped grooves with an angle (θ1) equal to 40°. The idler pulley 72 was pressed against the belt 10 so that the contact angle α between the drive pulley 64 and driven pulley 66 was 120°. The belt 10 was run at 85° C., with the belt tension being 40 kgf/rib. The drive pulley 64 was run at 4900 rpm, with the load on the driven pulley being 12 ps. The time required for the belt ribs 23 to crack was measured.

f. Durability at Low Temperatures

Each sample of the inventive belt was trained around a drive pulley having a 45 mm diameter and a tensioning pulley having a 45 mm diameter. Both pulleys had V-shaped grooves with an angle (θ1) of 40°. The belt tension was adjusted to 30 kgf/rib. The belt was run at −35° C., with the drive pulley running at 1800 rpm. The time required for the belt ribs 23 to crack was measured.

The results of this testing are shown in Table 2 below.

TABLE 2

|  | Example | | Comparative Example | | |
|---|---|---|---|---|---|
|  | 1 | 2 | 1 | 2 | 3 |
| Compound No. | 1 | 1 | 1 | 2 | 3 |
| Rib angle (°) | 42.5 | 44.5 | 40 | 40 | 42.5 |
| Overtension for noise | 6.5 | 6.5 | 6.5 | 6.0 | 6.0 |
| 6% slip (amount of wear, g) | 0.38 | 0.42 | 0.34 | 0.42 | 0.45 |
| Speed variation (amount of wear, g) | 0.24 | 0.24 | 0.24 | 0.22 | 0.26 |
| Durability at high temperature (h) | 300 | 313 | 286 | 320 | 335 |
| Durability at low temperature (h) | 46 | 67 | 51 | 42 | 35 |

As noted in Table 2, the lower limit of tension for noise generation decreases as the rib angle (θ) increases. This indicates that the instantaneous squeaking noise that occurs when the auxiliary machine is started is suppressed even if the belt tension decreases during running. It is noted that the lower limit of tension for noise generation is smaller for the inventive samples than for the comparative belt samples.

As also seen in Table 2, there is no change in the upper tension level for which noise is generated, regardless of the rib angle (θ). The amount of wear in the 6% slip test and speed variation test increased with the increasing rib angle (θ). However, the amount was small and no sticking occurred on the surfaces of the ribs.

The belt with a larger rib angle (θ) was superior in durability in the durability test at high temperatures (with low tension) and at low temperatures.

The foregoing disclosure of specific embodiments is intended to be illustrative of the broad concepts comprehended by the invention.

We claim:

1. A power transmission system comprising:
   a power transmission belt comprising a body having a length, an inside surface, an outside surface and laterally spaced side surfaces,
   the side surfaces making with each other a first angle; and
   a pulley having a rotational axis and facing surfaces to engage the side surfaces of the power transmission belt body,
   said facing surfaces on the pulley making with each other an angle of 2°–10° less than the first angle.

2. The power transmission system according to claim 1 wherein there are a plurality of laterally extending discrete fibers embedded in the body and having portions projecting from at least one of the side surfaces of the body, the fibers are para-aramid fibers and the projecting portions of the para-aramid fibers are fibrillized.

3. The power transmission system according to claim 2 wherein the fibers have a length of 2–6 mm and a diameter of 9–18 μm.

4. The power transmission system according to claim 3 wherein the fibers have fibrillized portions projecting from the at least one side surface of the body that have a diameter of ⅛ to ½ the diameter of the fibers.

5. The power transmission system according to claim 2 wherein the belt body comprises rubber in which the fibers are embedded and the fibers are present in an amount of 5–25 parts by weight per 100 parts by weight of rubber.

6. The power transmission system according to claim 1 wherein the body has a compression section that is defined at least partially by rubber and there is a slip agent in the rubber in an amount of 0.5–3 parts by weight of slip agent per 100 parts by weight of rubber.

7. The power transmission system according to claim 6 wherein the slip agent comprises a microcrystalline wax.

8. The power transmission system according to claim 1 wherein the fibers comprise at least one of a) para-aramid fiber, b) para-aramid fiber in combination with at least one of nylon, vinylon, polyester and meta-aramid fiber, and c) natural fiber that is at least one of cotton and pulp.

9. The power transmission system according to claim 1 wherein the power transmission belt is a V-ribbed belt.

10. The power transmission system according to claim 9 wherein the power transmission belt is a V-ribbed belt, and the V-ribbed belt body includes an inextensible layer, an extensible layer, and a compressible rubber layer, with the fibers being embedded in the compressible rubber layer.

11. The power transmission system according to claim 10 wherein the inextensible layer comprises load carrying cords embedded in rubber wherein the rubber in which the load carrying cords are embedded and the rubber in the compressible rubber layer is at least one of chloroprene rubber (CR), hydrogenated nitrile rubber (HNBR), natural rubber (NR), chlorosulphonated polyethylene rubber (CSM) and styrene-butadiene rubber (SBR).

12. The power transmission system according to claim 10 wherein the load carrying cords comprise at least one of polyester fiber, nylon fiber and aramid fiber.

13. The power transmission system according to claim 10 wherein there is at least one rubberized canvas layer on the extensible layer and the rubberized canvas layer is woven from yarns that are at least one of a) cotton and b) cotton blended with synthetic fiber.

14. The power transmission system according to claim 10 wherein the compressible rubber layer comprises 30–70 parts by weight of carbon black per 100 parts by weight of rubber.

15. The power transmission system according to claim 14 wherein the compressible rubber layer further includes at least one of a vulcanizing agent, an accelerator, and an antioxidant.

16. A power transmission system comprising:
    a body having a length, an inside surface, an outside surface and laterally spaced side surfaces,
    there being a plurality of laterally extending discrete fibers embedded in the body and having portions projecting from at least one of the side surfaces of the body,
    the side surfaces making with each other a first angle of 42°–50°; and
    a pulley having a rotational axis and facing surfaces to engage the side surfaces of the power transmission belt body and the facing surfaces of the pulley make with each other an angle of 2°–10° less than the first angle.

17. The power transmission system according to claim 16 in combination with a fluid compressor having a shaft that is rotable to effect operation of the compressor and the pulley is on the shaft of the fluid compressor.

18. The power transmission system according to claim 17 in combination with an automobile having an engine compartment and the compressor is in the engine compartment.

19. A power transmission system comprising:
    a) a power transmission belt comprising:
       a body having a length, an inside surface, an outside surface and laterally spaced side surfaces,
       there being a plurality of laterally extending discrete fibers embedded in the body and having portions projecting from at least one of the side surfaces of the body,
       wherein the side surfaces make with each other a first angle; and
    b) a pulley having a groove with facing surfaces that engage the side surfaces of the body,
       said facing surfaces on the pulley making with each other a second angle that is 2°–10° less than the first angle.

20. The power transmission system according to claim 19 wherein the power transmission belt is a V-ribbed belt with a plurality of laterally spaced ribs each having side surfaces making with each other the first angle and there are a plurality of grooves in the pulley with each groove having facing surfaces making with each other an angle that is 2°–10° less than the first angle.

21. The power transmission system according to claim 20 wherein the first angle is 42°–50°.

22. The power transmission system according to claim 19 wherein the fibers comprise para-aramid fibers.

23. The power transmission system according to claim 22 wherein a plurality of the fibers have portions that project from the side surfaces of the body.

24. The power transmission system according to claim 23 wherein a plurality of the fiber portions that project from the side surfaces of the body are fibrillated.

25. A V-ribbed power transmission belt comprising:

a body having a length, an inside surface, an outside surface, and laterally spaced side surfaces, wherein the side surfaces on each rib make an angle with each other of 42°–50°, there being a plurality of laterally extending discrete para-aramid fibers embedded in the body and having portions projecting from at least one of the side surfaces of the body, said body including a compressible rubber layer, the fibers being present in the compressible rubber layer in an amount of 5–25 parts by weight of fiber per 100 weight parts of rubber and having fibrillated portions projecting from the side surfaces of the body, there further being a slip agent in the compressible rubber layer that is present in an amount of 0.5–3 parts by weight of slip agent per 100 weight parts of rubber, said slip agent comprising a microcrystalline wax, said body having load carrying cords embedded therein.

26. A power transmission system comprising:

a power transmission belt comprising a body having a length, an inside surface, an outside surface and laterally spaced side surfaces, there being a plurality of laterally extending discrete fibers embedded in the body and having portions projecting from at least one of the side surfaces of the body, said body including a compressible rubber layer, the fibers being present in the compressible rubber layer in an amount of 5–25 parts by weight of fiber per 100 weight parts of rubber, there further being a slip agent in the compressible rubber layer that is present in an amount of 0.5–3 parts by weight of slip agent per 100 weight parts of rubber, wherein the power transmission belt is a V-ribbed belt with a plurality of ribs extending in a lengthwise direction and each having oppositely facing side surfaces making with each other an angle of 42°–50°; and a pulley having grooves to receive the ribs on the V-ribbed power transmission belt and each said pulley groove has facing surfaces to engage a rib on the V-ribbed power transmission belt and the facing side surfaces on the pulley make with each other an angle that is 2°–10° less than the angle that the side surfaces on the ribs make with each other.

* * * * *